United States Patent
Edberg et al.

(10) Patent No.: US 11,942,742 B2
(45) Date of Patent: Mar. 26, 2024

(54) CONDENSER CORE, BUSHING, HIGH VOLTAGE APPLICATION AND METHOD OF PRODUCING BUSHING

(71) Applicant: Hitachi Energy Ltd, Zürich (CH)

(72) Inventors: Björn Edberg, Beddingestrand (SE); Thomas Eriksson, Ludvika (SE); Peter Sjöberg, Ludvika (SE)

(73) Assignee: HITACHI ENERGY LTD, Zurich (CH)

( * ) Notice: Subject to any disclaimer, the term of this patent is extended or adjusted under 35 U.S.C. 154(b) by 431 days.

(21) Appl. No.: 17/288,895

(22) PCT Filed: Sep. 18, 2019

(86) PCT No.: PCT/EP2019/075016
§ 371 (c)(1),
(2) Date: Apr. 26, 2021

(87) PCT Pub. No.: WO2020/088833
PCT Pub. Date: May 7, 2020

(65) Prior Publication Data
US 2022/0006208 A1    Jan. 6, 2022

(30) Foreign Application Priority Data

Oct. 31, 2018    (EP) .................................... 18203820

(51) Int. Cl.
*H01B 17/28*    (2006.01)
*H01G 4/242*    (2006.01)
(Continued)

(52) U.S. Cl.
CPC ............. *H01R 4/42* (2013.01); *H01B 17/28* (2013.01); *H01G 4/242* (2013.01); *H01G 4/35* (2013.01);
(Continued)

(58) Field of Classification Search
CPC ..................................................... H01B 17/28
See application file for complete search history.

(56) References Cited

U.S. PATENT DOCUMENTS

| 3,783,181 A | 1/1974 | Martincic et al. |
| 10,366,808 B2 | 7/2019 | Paul et al. |

(Continued)

FOREIGN PATENT DOCUMENTS

| CN | 101515705 A | 8/2009 |
| CN | 203398692 U | 1/2014 |

(Continued)

OTHER PUBLICATIONS

International Search Report and Written Opinion of the International Searching Authority, PCT/EP2019/075016, dated Oct. 30, 2019, 15 pages.

(Continued)

*Primary Examiner* — Hung V Ngo
(74) *Attorney, Agent, or Firm* — Sage Patent Group

(57) ABSTRACT

A condenser core for being positioned around a high voltage main electrical conductor, the condenser core including an electrically insulating body; a longitudinal through hole for accommodating the main electrical conductor; a plurality of electrically conductive foils encircling the through hole and being surrounded by the body such that each foil is insulated from any other of the foils; a potential electrical conductor for establishing an electrical connection between one of the foils and the main electrical conductor when the main electrical conductor is accommodated in the through hole; and a fastening device configured to mechanically connect the potential electrical conductor to the main electrical conductor when the main electrical conductor is accommodated in the through hole. A bushing, a high voltage application and a method of producing a bushing are also provided.

20 Claims, 3 Drawing Sheets

(51) Int. Cl.
    *H01G 4/35*     (2006.01)
    *H01G 4/40*     (2006.01)
    *H01R 4/04*     (2006.01)
    *H01R 4/42*     (2006.01)
    *H01R 43/00*     (2006.01)
    *H01F 27/04*     (2006.01)
    *H01G 4/32*     (2006.01)

(52) U.S. Cl.
    CPC ............. *H01G 4/40* (2013.01); *H01R 4/04* (2013.01); *H01R 43/00* (2013.01); *H01F 27/04* (2013.01); *H01G 4/32* (2013.01)

(56) References Cited

U.S. PATENT DOCUMENTS

| | | | | |
|---|---|---|---|---|
| 2016/0329134 A1* | 11/2016 | Emilsson | ............... | H01B 19/04 |
| 2017/0047721 A1 | 2/2017 | Engels et al. | | |
| 2020/0411208 A1* | 12/2020 | Liu | ............... | H01B 17/28 |
| 2022/0037062 A1* | 2/2022 | Pancheshnyi | ............. | H01B 17/28 |
| 2022/0415544 A1* | 12/2022 | Kanje-Nordberg | .... | H01B 17/28 |

FOREIGN PATENT DOCUMENTS

| | | |
|---|---|---|
| EP | 0024328 A1 | 3/1981 |
| EP | 2093777 A1 | 8/2009 |
| WO | 2015117823 A1 | 8/2015 |
| WO | 2017101992 A1 | 6/2017 |

OTHER PUBLICATIONS

International Preliminary Report on Patentability of the International Preliminary Examining Authority, PCT/EP2019/075016, dated Nov. 24, 2020, 37 pages.

Extended European Search Report dated Mar. 22, 2019 for European Patent Application No. 18203820.8, 9 pages.

Chinese First Office Action dated Nov. 30, 2021 for Chinese Patent Application No. 2019800655555, 7 pages (including English translation).

* cited by examiner

CONDENSER CORE, BUSHING, HIGH VOLTAGE APPLICATION AND METHOD OF PRODUCING BUSHING

CROSS REFERENCE TO RELATED APPLICATIONS

This application is a 35 U.S.C. § 371 national stage application of PCT International Application No. PCT/EP2019/075016 filed on Sep. 18, 2019, which in turns claims foreign priority to European Patent Application No. 18203820.8, filed on Oct. 31, 2018, the disclosures and content of which are incorporated by reference herein in their entirety.

TECHNICAL FIELD

The present disclosure generally relates to a condenser core. In particular, a condenser core for being positioned around a high voltage main electrical conductor, a bushing for a high voltage application, which bushing comprises a condenser core, a high voltage application comprising a condenser core, and a method of producing a bushing for a high voltage application, are provided.

BACKGROUND

High voltage bushings are used for carrying current at high potential through a plane, often referred to as a grounded plane, where the plane is at a different potential than the current path. High voltage bushings are designed to electrically insulate a high voltage conductor, located inside the bushing, from the grounded plane. The grounded plane can for example be a wall of a transformer tank.

In order to obtain a smoothening of the electrical potential distribution between the high voltage conductor and the grounded plane, a bushing often comprises a number of foils made of a conducting material, such as aluminium, which coaxially surround the high voltage conductor in a so-called condenser core. The foils are typically separated by a dielectric insulating material, such as oil impregnated paper (OIP), resin impregnated paper (RIP) or resin impregnated synthetics (RIS). The foils serve to smoothen the electric field distribution between the outside of the bushing and the inner high voltage conductor, thus reducing the local electric field enhancement. The coaxial foils help to form a more homogeneous electric field, and thereby reduce the risk for electric breakdown and subsequent thermal damage.

An RIP condenser core is typically produced by winding paper sheets in concentric layers and positioning aluminium foils between some of the paper layers such that the foils are insulated from each other. Under vacuum, the dry paper layers are impregnated with epoxy resin, after which the resin is cured to produce the RIP condenser core. Some RIP condenser cores are wound directly on the high voltage conductor. A potential connection may be made between the high voltage conductor and the innermost foil in the condenser core in order to achieve an environment within the innermost foil which is free of an electrical field.

WO 2015117823 A1 discloses a resin impregnated paper (RIP) condenser core configured for being positioned around an electrical conductor. The condenser core comprises an electrically insulating winding tube forming a longitudinal through hole through the condenser core, configured for allowing an electrical conductor to be inserted there through; an electrically insulating RIP body wound onto and around the winding tube; and at least one electrically conductive foil coaxially encircling the winding tube and being surrounded by the RIP body insulating each of the at least one foil from any other of the at least one foil. The condenser core further comprises an electrical connection, contacting at least one of the foils, and being configured to contact the conductor when the conductor is inserted through the winding tube.

US 2017047721 A1 discloses a high-voltage bushing containing an insulating body, conductive control inlays and insulation layers. A connection device is provided for establishing an electrical connection between a first control inlay closest to a winding support, and the winding support. The high-voltage bushing is characterized in that the connection device contains an electrical sliding contact.

EP 0024328 A1 discloses a connecting terminal for electrical devices, a clamping screw of which is held in a clamping base and which has a clamp for holding elements to be connected against the contact surface on the clamping base.

WO 2017101992 A1 discloses a high-voltage apparatus comprising an internal conductor, an insulating body, insulating layers and electrically conductive control inserts. At least one of the control inserts is a contact insert which is electrically connected to the internal conductor by means of a contact-making device.

U.S. Pat. No. 3,783,181 A discloses an electrical bushing having a corona shield. The bushing contains an opening through an epoxy insulator. The opening is lined with a shield having a thin conducting layer.

SUMMARY

One object of the present disclosure is to provide a condenser core that reduces the risk of partial discharge.

A further object of the present disclosure is to provide a condenser core that can easily be manufactured with high quality.

A still further object of the present disclosure is to provide a condenser core that provides a reliable operation.

A still further object of the present disclosure is to provide a condenser core having a strong design.

A still further object of the present disclosure is to provide a condenser core having a simple and/or cheap design.

A still further object of the present disclosure is to provide a condenser core that solves several or all of the foregoing objects in combination.

A still further object of the present disclosure is to provide a bushing for a high voltage application, which bushing solves one, several or all of the foregoing objects.

A still further object of the present disclosure is to provide a high voltage application which solves one, several or all of the foregoing objects.

A still further object of the present disclosure is to provide a method of producing a bushing for a high voltage application, which method solves one several or all of the foregoing objects.

According to one aspect, there is provided a condenser core for being positioned around a high voltage main electrical conductor, the condenser core comprising an electrically insulating body; a longitudinal through hole for accommodating the main electrical conductor; a plurality of electrically conductive foils encircling the through hole and being surrounded by the body such that each foil is insulated from any other of the foils; a potential electrical conductor for establishing an electrical connection between one of the foils and the main electrical conductor when the main electrical conductor is accommodated in the through hole; and a fastening device configured to mechanically connect the potential electrical conductor to the main electrical conductor when the main electrical conductor is accommodated in the through hole.

The fastening device provides a mechanical joint by means of which the electrical connection between the main electrical conductor and the potential electrical conductor can be reliably maintained. When for example a body of a condenser core shrinks during curing of resin that impregnates the body, a contact point between the potential electrical conductor and the main electrical conductor may be subjected to stresses and movements. By means of the fastening device, the electrical connection between the main electrical conductor and the potential electrical conductor is maintained when the body shrinks during curing of the resin, and when the condenser core is subjected to vibrations. The functioning of the condenser core can thereby be ensured and the risk of partial discharge is reduced.

The fastening device may also be configured to electrically connect the potential electrical conductor to the main electrical conductor. Thus, the fastening device may comprise, or be constituted by, an electrically conductive material.

The potential electrical conductor may additionally be electrically connected to the main electrical conductor by means of electrically conductive glue. By means of the fastening device, the potential electrical conductor can be maintained secured to the main electrical conductor during various production steps of the condenser core until the electrically conductive glue has hardened.

The potential electrical conductor may be electrically connected to an innermost foil of the condenser core, e.g. with respect to a longitudinal axis of the main electrical conductor. The potential electrical conductor provides high voltage potential from the main electrical conductor to this foil. Thereby, electrical fields between the main electrical conductor and the innermost foil can be avoided. Throughout the present disclosure, the main electrical conductor and the potential electrical conductor may alternatively be referred to as a first electrical conductor and a second electrical conductor, respectively. Alternatively, the main electrical conductor and the potential electrical conductor may be referred to as a high voltage conductor and a short conductor, respectively.

Throughout the present disclosure, the electrically conductive foils may alternatively be referred to as field-grading layers, screens or shield foils. Furthermore, throughout the present disclosure, the condenser core may be an OIP (oil-impregnated paper), RIP (resin-impregnated paper) or RIS (resin-impregnated synthetics) condenser core.

The fastening device may comprises a fastener constituted by a screw. The fastening device may alternatively comprise a fastener other than a screw, such as a rivet, bolt, nail or pin. The fastening device may comprise only the fastener, or may comprise the fastener and one or more additional parts. A fastening device according to the present disclosure may be a mechanical fastening device.

The fastening device may comprise a fastener, such as a screw or bolt, and a washer for being pressed by the fastener such that the washer presses the potential electrical conductor against the main electrical conductor. According to one variant, the washer is pressed by both the fastener and by the body, e.g. by an RIP condenser core. The washer may be made of stainless steel, such as austenitic stainless steel.

The washer may comprise a laterally outer rounded edge. This reduces the local electric field enhancement.

The washer may be countersunk. For example, in case the fastener is a screw, a head of the screw may be seated in the countersunk region of the washer such that an outer surface of the head of the screw is flush with an outer surface of the washer. In this way, a smooth exterior profile of the fastening device is provided, which reduces the electric field strength on the main electrical conductor. The outer surfaces of the screw and the washer may in turn extend radially outside of an outer surface of the main electrical conductor with respect to a longitudinal axis of the main electrical conductor.

The potential electrical conductor may be a wire, such as a braided wire. The potential electrical conductor may for example be made of aluminium or copper.

The condenser core may further comprise an electrically insulating compressive layer. In this case, the body may be wound onto and around the compressive layer and the potential electrical conductor may pass through the compressive layer. For this purpose, the condenser core may comprise a hole, through the compressive layer and through the part of the body inside the innermost foil, through which the potential electrical conductor can be led. The compressive layer may be wound onto the main electrical conductor. The compressive layer may for example be made of cork rubber and Teflon®. The body and each foil may coaxially encircle the compressive layer and/or the through hole.

As an alternative, or addition, to a compressive layer, the condenser core may comprise an electrically insulating winding tube. The winding tube may for example be made of RIP, paper or another fibre composite material.

The through hole may be formed by the body of the condenser core. Alternatively, in case the condenser core comprises a compressive layer, the through hole may be formed by the compressive layer. A high voltage within the present disclosure may be a voltage of at least 1 kV, such as at least to 10 kV, such as at least 35 kV.

The body may comprise, or be constituted by, resin impregnated paper or resin impregnated synthetics. When the resin is cured, the body shrinks and applies a compressive force on the main electrical conductor and on the fastening device. This further enhances the mechanical and electrical connection between the potential electrical conductor and the main electrical conductor.

According to a further aspect, there is provided a bushing for a high voltage application, the bushing comprising a condenser core according to the present disclosure and a main electrical conductor. In the bushing, the potential electrical conductor may be electrically connected between one of the foils and the main electrical conductor, and the potential electrical conductor may be mechanically connected to the main electrical conductor by means of the fastening device. Furthermore, the body may be shrink-fitted around the main electrical conductor. The fastening device (e.g. a fastener and/or a washer thereof) may extend radially outside of the main electrical conductor, with respect to a longitudinal axis of the main electrical conductor. Alternatively, an outer surface of the fastening device may be flush with an outer surface of the main electrical conductor.

According to a further aspect, there is provided a high voltage application comprising a condenser core according to the present disclosure or a bushing according to the present disclosure. The high voltage application may for example comprise a transformer.

According to a further aspect, there is provided a method of producing a bushing for a high voltage application, the method comprising providing a main electrical conductor in a through hole of an electrically insulating body; establishing an electrical connection between an electrically conductive foil and the main electrical conductor by means of a potential electrical conductor; mechanically connecting the potential electrical conductor to the main electrical conductor; arranging the foil to encircle the through hole; winding at least one sheet of an insulating material over the foil; and impregnating the body to form a condenser core.

The impregnation may be a resin impregnation. Alternatively, or in addition, the step of impregnating the body may comprise impregnating a paper body with oil, impregnating a paper body with resin, or impregnating a synthetic body with resin.

At least one sheet of an insulating material may be wound over the main electrical conductor in order to provide the main electrical conductor in a through hole of an electrically insulating body. For example, the condenser core may comprise an electrically insulating compressive layer forming the longitudinal through hole and the body may be wound onto and around the compressive layer.

The winding of at least one sheet of insulating material over the foil may comprise winding sheets of insulating material, with one or more additional intermediate electrically conductive foils to form the electrically insulating body surrounding the foils and encircling the main electrical conductor. Alternatively, each foil of the condenser core may be provided on a continuous sheet of insulating material. In this case, the winding may comprise winding such continuous sheet.

The method may further comprise cutting through an inner portion of the body to the main electrical conductor, opening the inner portion of the body, electrically and mechanically connecting the potential electrical conductor to the main electrical conductor, and closing the inner portion of the body over the connection between the potential electrical conductor and the main electrical conductor. In case the body is wound onto and around an electrically insulating compressive layer, the cutting may comprise cutting through the compressive layer.

According to one example, a slit is cut through the inner portion of the body (and optional compressive layer) and a flap of the body formed by the slit is folded open. The potential electrical conductor is then electrically and mechanically connected to the main electrical conductor, e.g. by means of a screw, a washer and electrically conductive glue. The flap is then folded back onto the main electrical conductor and the potential electrical conductor is electrically connected to the foil, e.g. by means of electrically conductive glue. The foil may then be wound (or completely wound) around the body before winding further sheets of insulating material and one or more additional intermediate electrically conductive foils.

The mechanical connection comprises connecting the potential electrical conductor to the main electrical conductor by means of a fastening device according to the present disclosure. Alternatively, or in addition, the method may further comprise electrically connecting the potential electrical conductor to the main electrical conductor by means of electrically conductive glue prior to mechanically connecting the potential electrical conductor to the main electrical conductor.

The method may further comprise pressing the potential electrical conductor against the main electrical conductor by means of a washer according to the present disclosure. Alternatively, or in addition, the method may further comprise arranging the fastening device to be pressed against the main electrical conductor by a shrinkage of the body of the condenser core.

BRIEF DESCRIPTION OF THE DRAWINGS

Further details, advantages and aspects of the present disclosure will become apparent from the following embodiments taken in conjunction with the drawings, wherein.

DETAILED DESCRIPTION

Figure 1:
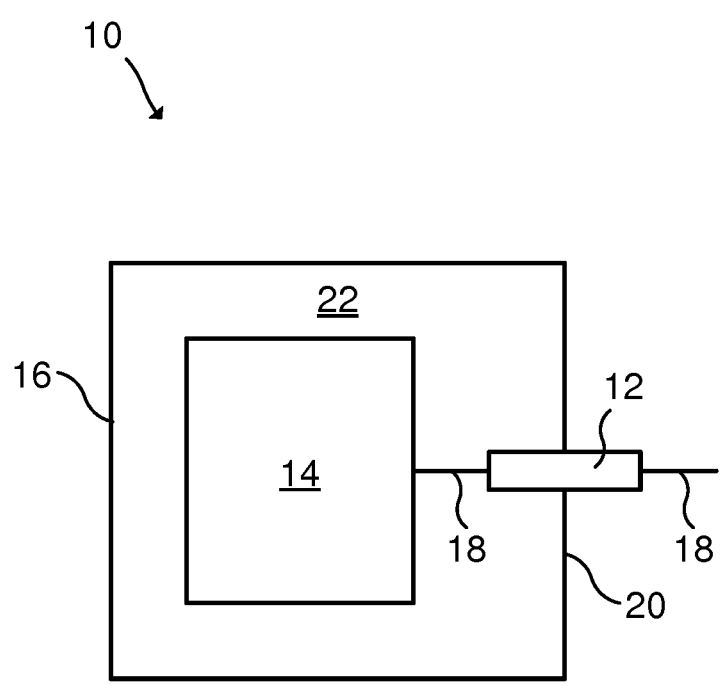
FIG. 1: schematically represents a high voltage application comprising a bushing.

In the following, a condenser core for being positioned around a high voltage main electrical conductor, a bushing for a high voltage application, which bushing comprises a condenser core, a high voltage application comprising a condenser core, and a method of producing a bushing for a high voltage application, will be described. The same reference numerals will be used to denote the same or similar structural features.

FIG. 1 schematically represents a high voltage application 10 comprising a bushing 12 according to the present disclosure. The high voltage application 10 is here exemplified as a transformer 14 arranged in a tank 16. The bushing 12 is for conducting an electrical current in a main electrical conductor 18 through a wall 20 of the tank 16 to the transformer 14.

The tank 16 is at least partly filled with an electrically insulating fluid 22, in this example a dielectric oil, such as a mineral oil or an ester-based oil. The bushing 12 extends from the insulating fluid 22 to the outside of the tank 16. In this example, the high voltage application 10 is surrounded by air. The bushing 12 thus constitutes an oil-to-air bushing.

The transformer 14 may be a high voltage power transformer, e.g. having a rating or operating voltage of at least 1 kV, such as at least 10 kV, such as at least 35 kV, e.g. within the range of 50-200 kV. Thus, a high voltage current is passed from the transformer 14 through the bushing 12 via the main electrical conductor 18 passing through the through hole of the bushing 12. The bushing 12 may, by means of its associated main electrical conductor 18, conduct current from e.g. a winding of the transformer 14, through the wall 20 of the tank 16 and to e.g. an air-borne line of a power distribution network. The bushing 12 insulates the current from the wall 20, which constitutes a grounded plane, and any other external structures.

Figure 2:
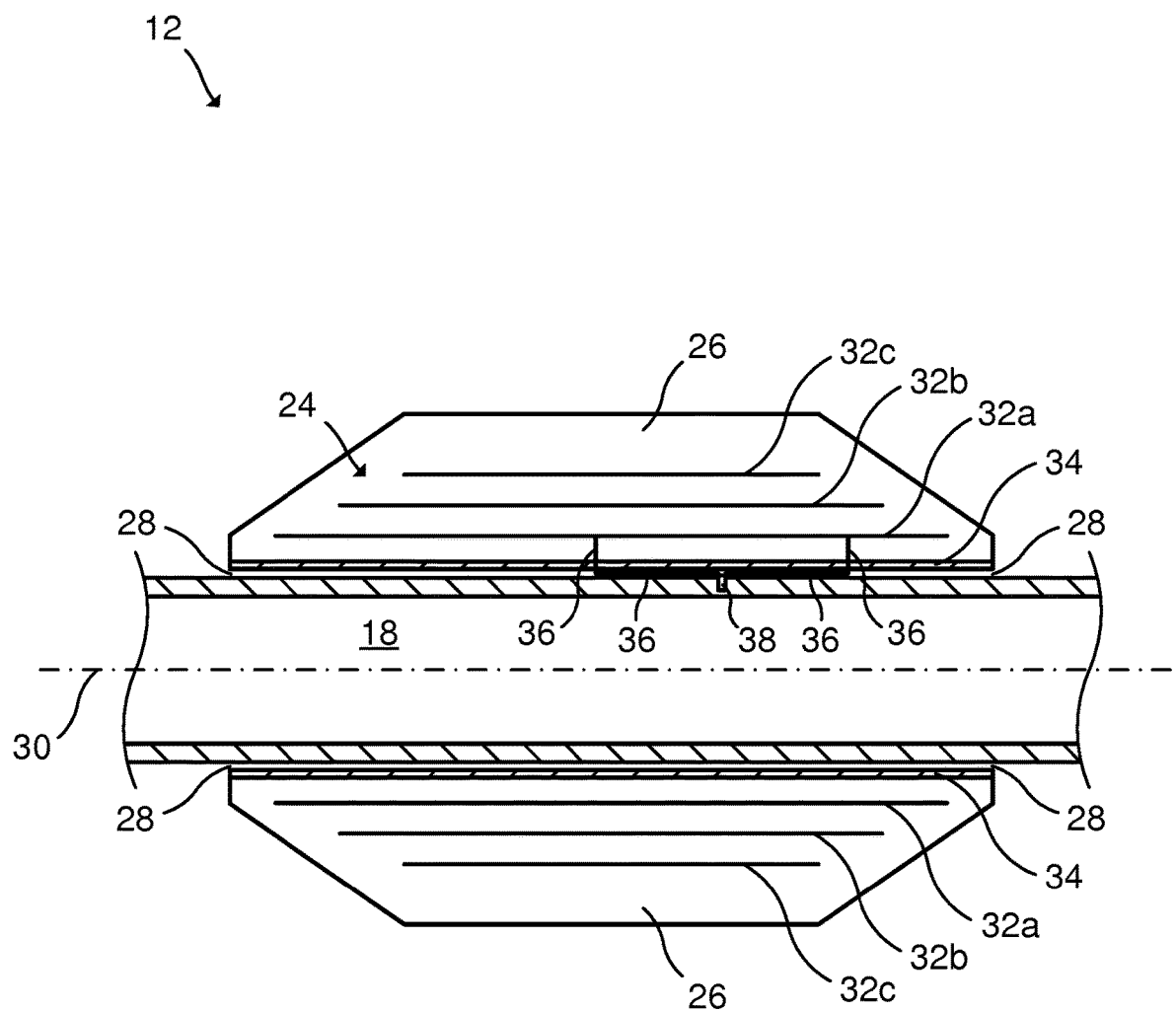
FIG. 2: schematically represents the bushing in FIG. 1 comprising a condenser core and a main electrical conductor.

FIG. 2 schematically represents the bushing 12 in FIG. 1. The bushing 12 comprises the main electrical conductor 18 and a condenser core 24 positioned around the main electrical conductor 18.

The condenser core 24 comprises an electrically insulating body 26 and a longitudinal through hole 28 through which the main electrical conductor 18 passes. The body 26 includes insulation material, for example combinations of oil and paper, resin and paper, or resin and synthetics. FIG. 2 further shows a longitudinal axis 30 of the main electrical conductor 18.

The condenser core 24 further comprises a plurality of electrically conductive foils 32a, 32b, 32c coaxially encircling the through hole 28 and the main electrical conductor 18 (each foil 32a, 32b, 32c is also referred to with reference numeral "32"). Any or all of the foils 32 may be of any suitable conductive material, e.g. aluminium or copper. Each foil 32 is surrounded by the body 26 such that each foil 32 is insulated from any of the other foils 32. Although the condenser core 24 in FIG. 2 comprises three foils 32, the condenser core 24 may comprise only two foils 32, or more than three foils 32.

The condenser core 24 of this example further comprises an optional electrically insulating compressive layer 34. The compressive layer 34 may for example comprise cork rubber and Teflon®. The body 26 is wound onto and around the compressive layer 34. As shown in FIG. 2, the innermost foil 32a is in this example spaced from the compressive layer 34 by means of an inner part of the body 26.

The condenser core 24 further comprises two potential electrical conductors 36. The condenser core 24 may however comprise only one, or more than two potential electrical conductors 36. Each potential electrical conductor 36 is arranged to establish an electrical connection between the innermost foil 32a and the main electrical conductor 18. Each potential electrical conductor 36 passes through the compressive layer 34 and through a part of the body 26 radially inside of the foil 32a (with respect to the longitudinal axis 30 of the main electrical conductor 18). In this example, the potential electrical conductors 36 are constituted by braided copper wires.

As shown in FIG. 2, the condenser core 24 further comprises a fastening device 38. The fastening device 38 is configured to mechanically connect each potential electrical conductor 36 to the main electrical conductor 18 to secure an electrical connection therebetween.

Figure 3:
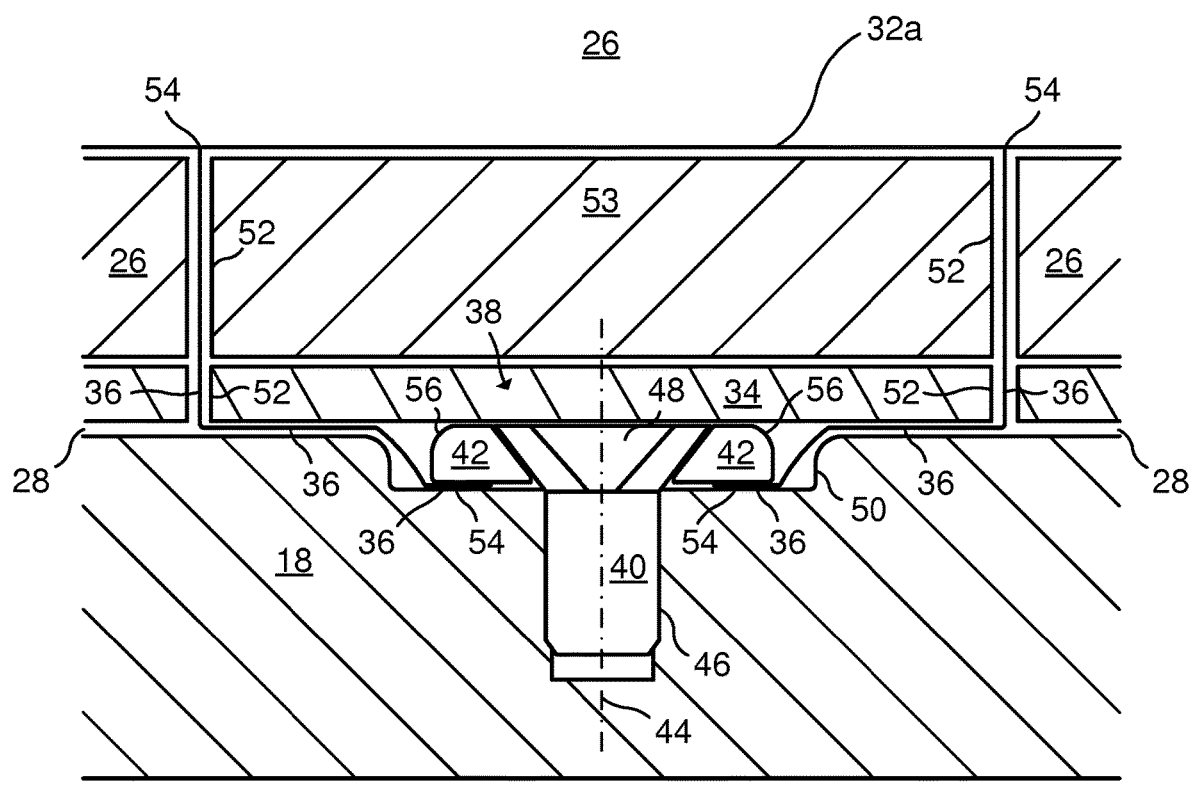
FIG. 3: schematically represents a partial enlarged view of the bushing in FIG. 2.

FIG. 3 schematically represents a partial enlarged view of the bushing 12 in FIG. 2. In the example in FIG. 3, the fastening device 38 comprises a fastener 40, here constituted by a self-tapping screw, and a washer 42. FIG. 3 also shows a longitudinal axis 44 of the fastener 40. The fastener 40 is engaged in a hole 46 in the main electrical conductor 18. The washer 42 and a head 48 of the fastener 40 are seated in an aperture 50 of the main electrical conductor 18. The aperture 50 has rounded edges in order to reduce the local electric field enhancement.

One example of a method of producing the bushing 12 according to the present disclosure will now be described. The optional electrically insulating compressive layer 34 is wound around the main electrical conductor 18. One or more sheets of an insulating material, such as paper, are then wound around the compressive layer 34. A hole 52 is cut for each potential electrical conductor 36. As shown in FIG. 3, each hole 52 is cut through the compressive layer 34 and through an inner portion 53 of the body 26 inside of the foil 32a. The holes 52 form part of a slit through the compressive layer 34 and the inner portion 53 of the body 26. The slit may be generally U-shaped, in a circumferential direction of the compressive layer 34, such that a flap of the compressive layer 34 and the inner portion 53 of the body 26 can be folded open. The hole 46 and/or the aperture 50 in the main electrical conductor 18 may be produced after having folded open the flap, or prior to winding the compressive layer 34 around the main electrical conductor 18.

The contact surfaces of the aperture 50 in the main electrical conductor 18 and of the potential electrical conductor 36 may be cleaned, e.g. with acetone, wiped dry, and polished to remove oxides. One end of each potential electrical conductor 36 is glued onto the main electrical conductor 18 by means of electrically conductive glue 54 such that each potential electrical conductor 36 is electrically connected to the main electrical conductor 18. Each potential electrical conductor 36 is glued on both sides. Electrically conductive glue 54 is also applied to the contact surface in the aperture 50 of the main electrical conductor 18. The electrically conductive glue 54 may be applied in thin layers.

The washer 42 is then placed on top of the ends of the potential electrical conductors 36 and the fastener 40 is inserted through the washer 42 and fastened in the hole 46 of the main electrical conductor 18. The fastening device 38 is thereby used to mechanically connect each potential electrical conductor 36 to the main electrical conductor 18. In this example, the fastener 40 is a screw that is screwed into the hole 46 such that the head 48 of the screw presses the washer 42. The washer 42 in turn presses the electrically conductive glue 54 and the potential electrical conductors 36 against the main electrical conductor 18. When tightening the fastener 40, the washer 42 tightly presses the potential electrical conductor 36 and the electrically conductive glue 54 against the main electrical conductor 18.

In FIG. 3, the outer surface of the head 48 of the fastener 40 and the outer surface of the washer 42 extend radially outside (with respect to the longitudinal axis 30) of the outer surface of the main electrical conductor 18. A small play may exist between the outer surfaces of the head 48 and the washer 42 and the compressive layer 34 prior to shrinkage of the body 26. The play may for example be approximately 0.5 mm. The washer 42 further comprises a laterally outer rounded edge 56 which reduces the local electric field enhancement.

The potential electrical conductors 36 are then lead up through the holes 52.

The flap is then folded back and the potential electrical conductors 36 are glued to the foil 32a. The foil 32a is then folded over the flap. Each potential electrical conductor 36 is connected to the foil 32a by means of electrically conductive glue 54. The remaining layers of insulating material and further foils 32b, 32c may then be wound over the foil 32a.

The body 26 is then impregnated with a resin, such as epoxy, followed by curing of the resin to form the condenser core 24. Due to the shrinkage of the body 26 during curing, the end of each potential electrical conductor 36 (the upper ends in FIG. 3) is self-locked to the foil 32a. Furthermore, the shrinkage of the body 26 causes the fastening device 38 (e.g. the fastener 40 and/or the washer 42 thereof) to be pressed against the main electrical conductor 18 to secure the electrical contact between the potential electrical conductor 36 and the main electrical conductor 18.

Each potential electrical conductor 36 may be formed with an excess bow or slack, for example of 10 mm. In this way, tension in the potential electrical conductor 36, due to the shrinking of the body 26 when cured, can be reduced or avoided.

While the present disclosure has been described with reference to exemplary embodiments, it will be appreciated that the present invention is not limited to what has been described above. For example, it will be appreciated that the dimensions of the parts may be varied as needed.

The invention claimed is:

1. A condenser core for being positioned around a high voltage main electrical conductor, the condenser core comprising:
   an electrically insulating body;
   a longitudinal through hole for accommodating the main electrical conductor;
   a plurality of electrically conductive foils encircling the through hole and being surrounded by the body such that each foil is insulated from any other of the foils; and a potential electrical conductor for establishing an electrical connection between one of the foils and the main electrical conductor when the main electrical conductor is accommodated in the through hole;

wherein the condenser core further comprises a fastening device, wherein the fastening device is configured to mechanically connect the potential electrical conductor to the main electrical conductor when the main electrical conductor is accommodated in the through hole and wherein the fastening device comprises a fastener and a washer for being pressed by the fastener such that the washer presses the potential electrical conductor against the main electrical conductor and the washer is countersunk.

2. The condenser core according to claim 1, wherein the washer comprises a laterally outer rounded edge.

3. The condenser core according to claim 1, further comprising an electrically insulating compressive layer which comprises cork rubber and Teflon, wherein the body is wound onto and around the compressive layer and wherein the potential electrical conductor passes through the compressive layer.

4. The condenser core according to claim 1, wherein the body comprises resin impregnated paper or resin impregnated synthetics.

5. A bushing for a high voltage application, the bushing comprising a condenser core according to claim 1 and a main electrical conductor, wherein the potential electrical conductor is electrically connected between one of the foils and the main electrical conductor, and wherein the potential electrical conductor is mechanically connected to the main electrical conductor by means of the fastening device.

6. The bushing according to claim 5, wherein the body is shrink-fitted around the main electrical conductor.

7. A high voltage application comprising a condenser core according to claim 1.

8. The condenser core according to claim 1, wherein the fastener comprises at least one of a screw, rivet, bolt, nail and pin.

9. A method of producing a bushing for a high voltage application, the method comprising:
providing a main electrical conductor in a through hole of an electrically insulating body; and
establishing an electrical connection between an electrically conductive foil and the main electrical conductor using a potential electrical conductor;
mechanically connecting the potential electrical conductor to the main electrical conductor;
arranging the foil to encircle the through hole;
winding at least one sheet of an insulating material over the foil; and
impregnating the body to form a condenser core wherein the mechanical connection comprises connecting the potential electrical conductor to the main electrical conductor using a fastening device; and a washer, the fastener pressing the washer such that the washer presses the potential electrical conductor against the main electrical conductor; and the washer is countersunk.

10. The method according to claim 9, further comprising cutting through an inner portion of the body to the main electrical conductor, opening the inner portion of the body, electrically and mechanically connecting the potential electrical conductor to the main electrical conductor, and closing the inner portion of the body over the connection between the potential electrical conductor and the main electrical conductor.

11. The method according to claim 9, further comprising electrically connecting the potential electrical conductor to the main electrical conductor using electrically conductive glue prior to mechanically connecting the potential electrical conductor to the main electrical conductor.

12. The method according to claim 9, further comprising pressing the potential electrical conductor against the main electrical conductor using a washer.

13. The method according to claim 9, wherein the fastener comprises at least one of a screw, rivet, bolt, nail, and pin.

14. The method according to claim 9, wherein the washer comprises a laterally outer rounded edge.

15. The method according to claim 9, further comprising winding the body onto and around a compressive layer comprising an electrically insulating compressive layer which comprises cork rubber and Teflon,
wherein the potential electrical conductor passes through the compressive layer.

16. The method according to claim 9, wherein the body comprises resin impregnated paper or resin impregnated synthetics.

17. A condenser core for being positioned around a high voltage main electrical conductor, the condenser core comprising:
an electrically insulating body;
a longitudinal through hole for accommodating the main electrical conductor;
a plurality of electrically conductive foils encircling the through hole and being surrounded by the body such that each foil is insulated from any other of the foils;
a potential electrical conductor for establishing an electrical connection between one of the foils and the main electrical conductor when the main electrical conductor is accommodated in the through hole; and
electrically conductive glue electrically connecting the potential electrical conductor to the main electrical conductor;
wherein the condenser core further comprises a fastening device, wherein the fastening device is configured to mechanically connect the potential electrical conductor to the main electrical conductor when the main electrical conductor is accommodated in the through hole and wherein the fastening device comprises a fastener and a washer for being pressed by the fastener such that the washer presses the potential electrical conductor against the main electrical conductor and the washer is countersunk.

18. The condenser core according to claim 17, wherein the washer comprises a laterally outer rounded edge.

19. The condenser core according to claim 17, further comprising an electrically insulating compressive layer which comprises cork rubber and Teflon, wherein the body is wound onto and around the compressive layer and wherein the potential electrical conductor passes through the compressive layer.

20. The condenser core according to claim 17, wherein the body comprises resin impregnated paper or resin impregnated synthetics.

* * * * *